United States Patent
Bowden

(10) Patent No.: US 9,470,489 B2
(45) Date of Patent: *Oct. 18, 2016

(54) AIRSOFT MARKING ROUND

(71) Applicant: Kerry Thaddeus Bowden, Woodruff, SC (US)

(72) Inventor: Kerry Thaddeus Bowden, Woodruff, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/818,551

(22) Filed: Aug. 5, 2015

(65) Prior Publication Data

US 2015/0338197 A1  Nov. 26, 2015

Related U.S. Application Data

(63) Continuation-in-part of application No. 13/894,243, filed on May 14, 2013, now Pat. No. 9,115,966.

(51) Int. Cl.
| | |
|---|---|
| *F42B 6/10* | (2006.01) |
| *B01J 13/02* | (2006.01) |
| *F42B 12/40* | (2006.01) |

(52) U.S. Cl.
CPC ............. *F42B 6/10* (2013.01); *B01J 13/02* (2013.01); *F42B 12/40* (2013.01)

(58) Field of Classification Search
CPC  A63B 37/0052; A63B 37/08; A63B 37/085; F42B 12/367; F42B 12/40; F42B 12/74; F42B 12/745; F42B 8/14; F42B 8/16; B01J 13/02
USPC ................................. 102/501, 502, 512, 513
See application file for complete search history.

(56) References Cited

U.S. PATENT DOCUMENTS

| | | | | |
|---|---|---|---|---|
| 6,238,616 | B1* | 5/2001 | Ishikawa | A61J 3/07 264/553 |
| 6,569,363 | B1* | 5/2003 | Schurig | A61J 3/07 264/4 |
| 6,574,945 | B2* | 6/2003 | Martinez, Jr. | B65B 9/02 206/219 |
| 6,990,791 | B2* | 1/2006 | Tanner | A61J 3/07 425/224 |
| 8,210,839 | B2* | 7/2012 | Dugand | F42B 12/40 222/105 |
| 9,115,966 | B2* | 8/2015 | Bowden | F42B 12/40 |
| 2004/0018327 | A1* | 1/2004 | Wynn | A23G 1/54 428/35.7 |
| 2010/0203122 | A1* | 8/2010 | Weyer | A01N 25/34 424/456 |
| 2011/0052645 | A1* | 3/2011 | Coulter | A61K 9/1617 424/400 |

* cited by examiner

*Primary Examiner* — Bret Hayes
(74) *Attorney, Agent, or Firm* — Dunlap Bennett & Ludwig PLLC

(57) ABSTRACT

A spherical pellet marking round for gas propelled guns, such as airsoft electric guns and gas blow back guns, allows a user or military/law enforcement trainees to actually when they hit their opponent. The marking round is heavier than conventional gas propelled gun rounds, allowing for more reliable breaking on target. The marking round has a hard, brittle shell and is sized for the gun or rifle type. The marking round can include colored marking material, ultraviolet, infrared, forward looking infrared (FLIR) and luminous "glow-in-the-dark" shells for tracer versions. An oversized wedge can be used in production that allows for heavier weighted fill material to be used.

12 Claims, 2 Drawing Sheets

AIRSOFT MARKING ROUND

CROSS-REFERENCE TO RELATED APPLICATION

This application is a continuation in part of U.S. non-provisional application No. 13/894,243, filed May 14, 2013 the contents of which are herein incorporated by reference.

BACKGROUND OF THE INVENTION

The present invention relates to gas propelled gun accessories and, more particularly, to spherical pellet marking rounds for gas propelled guns allowing users to see where they hit their target.

Airsoft electric guns (AEGs) and gas blow back (GBB) guns use air pressure to fire a projectile. These guns come in a wide variety of styles, including handguns, shotguns, rifles and even automatic machine guns. These guns, however, fire a small, 6 mm plastic BB, that is typically too light to reliably mark at distances greater than 70 feet.

In addition, with the conventional 6 mm plastic BB, there is no way for users or military/law enforcement trainees to actually see where they hit their opponent. While attempts have been made to create a marking round that could be fired from an AEG or a GBB gun, these attempts have regularly failed to survive being fired through the AEG rifle or GBB pistol.

As can be seen, there is a need for a marking round that can be successfully fired from an AEG or a GBB gun while being adequate to reliably mark at long distances, such as distances greater than 70 feet.

SUMMARY OF THE INVENTION

In one aspect of the present invention, a marking pellet comprises: a marking fill material; a shell encasing the marking fill material, wherein the marking pellet is formed by forcing ribbons of gelatin into recessed areas of a die using an oversized wedge and injecting the marking fill material into the shell, wherein the shell has an outside diameter from about 5.7 mm to about 5.95 mm, and the marking pellet has a weight between about 0.11 gram and about 0.27 gram.

In another aspect of the present invention, a method for making a marking pellet comprises: creating a gelatin base; creating a fill material by adding a heavy weight starch to water or polyethylene glycol; loading the gelatin base and the pigmented fill material to a soft gel encapsulation machine; forcing two ribbons of gelatin into recessed areas of a die using an oversized wedge; injecting the pigmented fill material between the two ribbons of the gelatin base without causing over pressurization to form pellets; and drying the pellets, wherein the pellets have a weight from about 0.11 gram to about 0.27 gram.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a spherical pellet marking round for gas propelled guns, such as airsoft electric guns and gas blow back guns. The marking round allows a user or military/law enforcement trainees to actually break when they hit their opponent. The marking round is heavier than conventional gas propelled gun rounds, allowing for more reliable breaking on target. The marking round has a hard, brittle shell and is sized for the gun or rifle type. This hard, brittle shell is designed to break like glass on the target. The shell is formed of a mixture of a gelatin base from water, gelatin and plasticizer, rubberizer, or agar. The agar makes the shell waterproof. The marking round can include colored marking material, ultraviolet, infrared, forward looking infrared (FLIR) and luminous "glow-in-the-dark" shells for tracer versions. An oversized wedge can be used in production that allows for heavier weighted fill material to be used.

Figure 1:
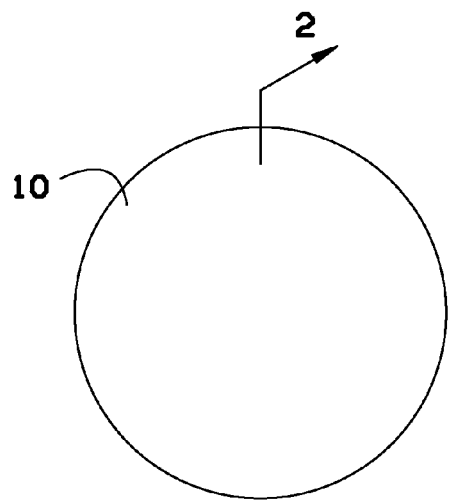
FIG. 1 is a perspective view of a marking round according to an exemplary embodiment of the present invention.
Figure 2:
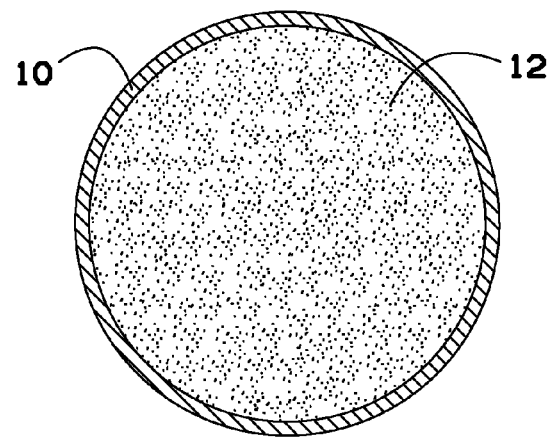
FIG. 2 is a cross-sectional view taken along line 2-2 of FIG. 1.
Figure 4:
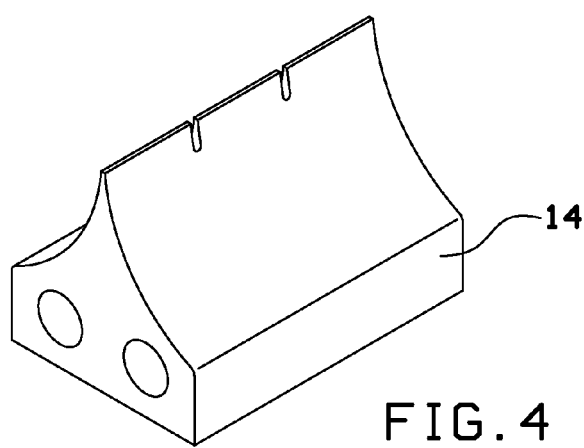
FIG. 4 is a perspective view of an oversized wedge that has larger than normal holes to allow more fill material to be injected between the gelatin ribbons without causing over pressurization.

Referring now to FIGS. 1 and 2, a marking round can include a hard, brittle shell 10 having a marking fill material 12 disposed therein. As mentioned above, an oversized wedge 14 can be used in the production of the marking round to allow a heavier weighted fill material to be used. The marking round of the present invention can have a weight that is increased by about 79% as compared to previous models. With the proper shell 10, the marking round of the present invention will break on target at greater than 120 feet.

Figure 3:
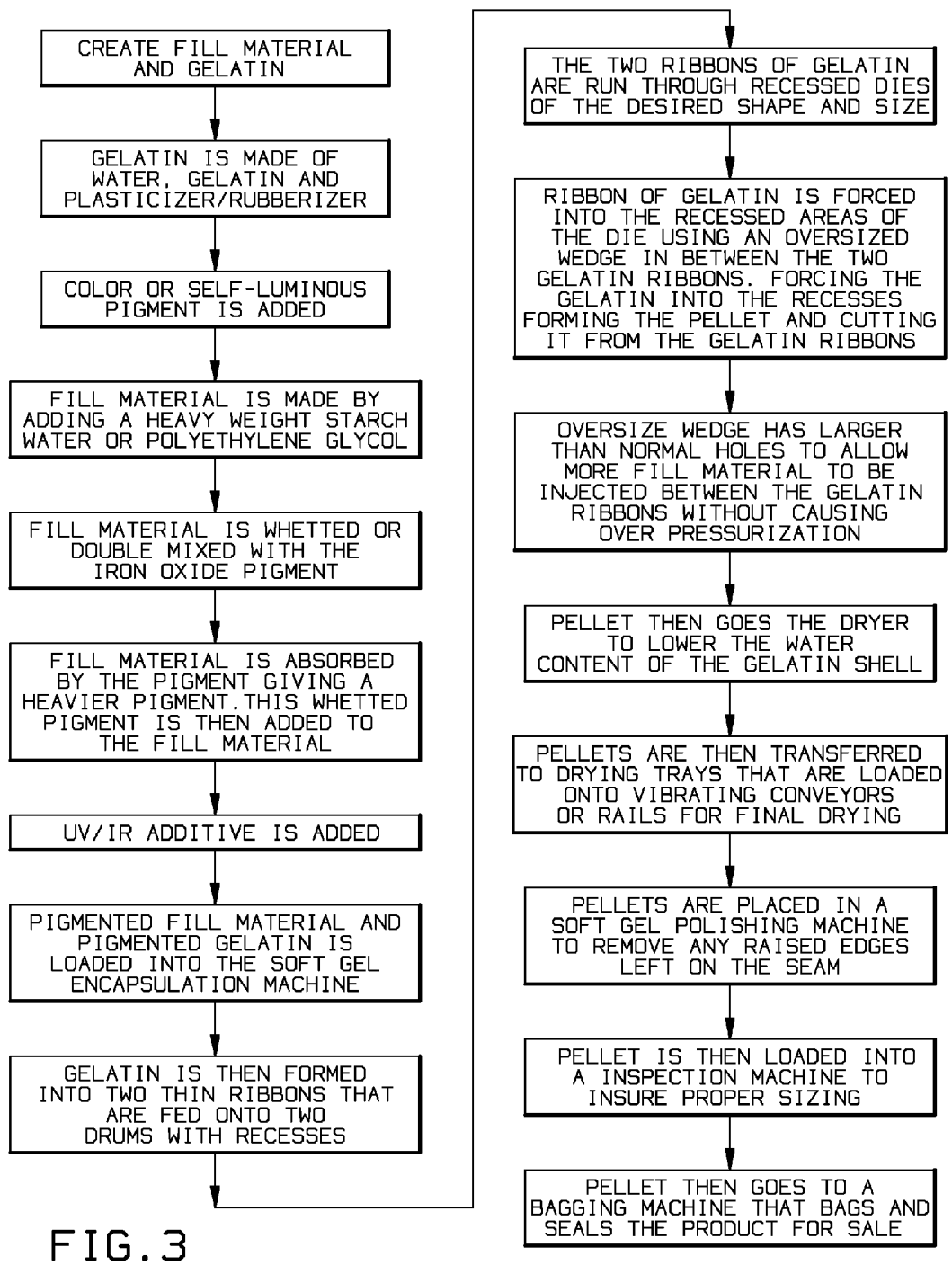
FIG. 3 is a process diagram describing a method for making an airsoft marking round according to an exemplary embodiment of the present invention.

Referring to FIG. 3, a first step is to make the fill material and gelatin. The gelatin can be made of water, gelatin and plasticizers/rubberizes or agar/water mixture. The gelatin color pigment is added. The fill material can be made with a heavy weight starch in water or polyethylene glycol. A process of whetting or double mixing an iron oxide pigment with the fill material can be carried out. The fill material can be absorbed by the pigment, giving a heavier pigment. This whetted pigment is then added to the fill material. An optional UV/IR additive is then added.

The pigmented fill material and the pigmented gelatin are then loaded into a soft gel encapsulation machine. The gelatin is then formed into two thin ribbons that are fed onto two drums with recesses.

The two ribbons of gelatin are run through recessed dies of the desired shape and size. The ribbon of gelatin is forced into the recessed areas of the die using an oversized wedge in between the two gelatin ribbons, forcing the gelatin into the recesses, forming the pellet, cutting it from the gelatin ribbons. The oversized wedge has larger than normal holes to allow more fill material to be injected between the gelatin ribbons without causing over pressurization. For example, a typical wedge may have holes that are 0.050 inches in diameter. The wedge of the present may include holes that have a diameter greater than 0.050 inches. In certain embodiments, the diameter of the holes of the oversized wedge may be from about 0.055 inches to about 0.0875 inches. For example, the wedge of the present invention may include holes that have a diameter of about 0.0625 inches.

The pellet is then allowed to dry to lower the water content of the gelatin shell. The pellets are then transferred to drying trays for further drying. The drying process can use a vibration system to keep the markers moving while they dry, assuring uniform roundness during drying. Other conventional pellets can misshape under storage conditions.

The product is then placed in a soft gel polishing machine to remove any raised edges left on the seam. The pellet is then loaded into an inspection machine to insure proper sizing. The pellet then goes to a bagging machine that bags and seals the product for sale.

There are three elements that allow the marking round of the present invention to break reliably every time on soft and hard targets—size, hardness/brittleness and pellet weight. The pellet size is between 5.7 mm and 5.95 mm, allowing the pellet to function without jamming in the barrel of the gun. If the pellet is above 5.95 mm, it can break in the barrel.

If the pellet does not have a hard, brittle shell, it will deform in the magazine, causing a jam. Moreover, without a hard, brittle shell, the pellet can also not properly seat in the barrel, causing breakage.

A light-weight pellet will typically not break at longer distances (such as distances greater than 70 feet) and will not break on soft targets. The marking round of the present invention has a weight between about 0.11 gram and about 0.27 gram. The use of an oversized wedge having larger diameter fill holes (as compared to conventional wedges) allows use of a heavier fill material, giving a heavier pellet.

By combining these three elements—size, hardness/brittleness and pellet weight—a marking pellet is obtained that will break on target, even at long distances, and not break or jam in the magazine or barrel.

While the above describes using the marking rounds for training, such as military and law enforcement training, the marking rounds can also be used to mark trails, mark boundaries, as well as in hunting and recreational airsoft use.

It should be understood, of course, that the foregoing relates to exemplary embodiments of the invention and that modifications may be made without departing from the spirit and scope of the invention as set forth in the following claims.

What is claimed is:

1. A marking pellet comprising:
a marking fill material;
a shell encasing the marking fill material, wherein
the marking pellet is formed by forcing ribbons into recessed areas of a die using an oversized wedge and injecting the marking fill material into the shell, wherein
the shell has an outside diameter from about 5.7 mm to about 5.95 mm, and
the marking pellet has a weight between about 0.11 gram and about 0.27 gram.

2. The marking pellet of claim 1, wherein the marking fill material is whetted or double mixed with an iron oxide pigment to permit the fill material to be absorbed by the iron oxide pigment.

3. The marking pellet of claim 1, wherein the shell is formed of a mixture of gelatin, water and plasticizer/rubberizer.

4. The marking pellet of claim 3, wherein the shell includes a color or a self-luminous pigment.

5. The marking pellet of claim 4, wherein the self-luminous pigment comprises at least one of an ultraviolet fill additive, an infrared fill additive and a forward looking infrared additive.

6. The marking pellet of claim 1, wherein the shell is formed of an agar and water mixture.

7. A method for making a marking pellet comprising:
creating a gelatin base;
creating a fill material by adding a heavy weight starch to water or polyethylene glycol;
loading the gelatin base and the pigmented fill material to a soft gel encapsulation machine;
forcing two ribbons of gelatin into recessed areas of a die using an oversized wedge;
injecting the pigmented fill material between the two ribbons of the gelatin base without causing over pressurization to form pellets; and
drying the pellets, wherein
the pellets have a weight from about 0.11 gram to about 0.27 gram.

8. The method of claim 7, wherein drying the pellets comprises vibration to keep the pellets moving during drying thereof.

9. The method of claim 7, further comprising polishing the pellets to remove any raised edges left on seams thereof.

10. The method of claim 7, further comprising inspecting the pellets to ensure a size of the pellets is from about 5.7 mm to about 5.95 mm.

11. The method of claim 7, further comprising adding an ultraviolet or an infrared additive to the fill material.

12. The method of claim 7, further comprising adding a color or a self-luminous pigment to the gelatin base.

* * * * *